(12) United States Patent
Ridderström

(10) Patent No.: US 11,611,691 B2
(45) Date of Patent: Mar. 21, 2023

(54) COMPUTER IMPLEMENTED METHOD AND A SYSTEM FOR COORDINATING TAKING OF A PICTURE USING A CAMERA AND INITIATION OF A FLASH PULSE OF AT LEAST ONE FLASH DEVICE

(71) Applicant: PROFOTO AKTIEBOLAG, Sundbyberg (SE)

(72) Inventor: Sven Christian Ridderström, Stockholm (SE)

(73) Assignee: PROFOTO AKTIEBOLAG, Sundbyberg (SE)

( * ) Notice: Subject to any disclaimer, the term of this patent is extended or adjusted under 35 U.S.C. 154(b) by 0 days.

(21) Appl. No.: 17/274,579

(22) PCT Filed: Sep. 4, 2019

(86) PCT No.: PCT/SE2019/050829
§ 371 (c)(1),
(2) Date: Mar. 9, 2021

(87) PCT Pub. No.: WO2020/055305
PCT Pub. Date: Mar. 19, 2020

(65) Prior Publication Data
US 2022/0053120 A1  Feb. 17, 2022

(30) Foreign Application Priority Data
Sep. 11, 2018 (SE) .................................. 1851073-5

(51) Int. Cl.
*H04N 5/232* (2006.01)
*G03B 15/05* (2021.01)
*H04N 5/235* (2006.01)

(52) U.S. Cl.
CPC ......... *H04N 5/23203* (2013.01); *G03B 15/05* (2013.01); *H04N 5/2354* (2013.01); *G03B 2206/00* (2013.01)

(58) Field of Classification Search
None
See application file for complete search history.

(56) References Cited

U.S. PATENT DOCUMENTS 4,373,793 A   2/1983  Taniguchi et al.
5,452,048 A   9/1995  Edgar
(Continued)

FOREIGN PATENT DOCUMENTS

CA   2967455 A1   11/2017
CN   1509130 A    6/2004
(Continued)

OTHER PUBLICATIONS

Extended European Search Report for European Patent Application No. 19858764.4, dated May 10, 2022, in 10 pages.
(Continued)

*Primary Examiner* — James M Hannett
(74) *Attorney, Agent, or Firm* — Knobbe, Martens, Olson & Bear, LLP

(57) ABSTRACT

The present disclosure relates to a computer implemented method and system for coordinating taking of a picture using a camera and initiation of a flash pulse of at least one flash device. The method is adapted for a system including a first device and at least one remote device. The method comprises the steps of obtaining a time base for a processor element of the first device, estimating a time base for a processor element of each at least one remote device in relation to the time base of the processor element of the first device, scheduling a timing for initiation of the flash pulse of the respective at least one flash device and/or a timing for
(Continued)

taking a picture using the camera in the time base of the first device so that the coordination with the timing for taking the picture is obtained, and obtaining at the respective remote device of the system the scheduled timing of initiation of the remote device in the time base of that device.

22 Claims, 5 Drawing Sheets

(56) References Cited

U.S. PATENT DOCUMENTS

| | | | |
|---|---|---|---|
| 6,178,296 | B1 | 1/2001 | Kojima |
| 6,404,987 | B1 | 6/2002 | Fukui |
| 7,420,613 | B2 | 9/2008 | Lee |
| 7,583,297 | B2 | 9/2009 | Yamada |
| 7,697,062 | B2 | 4/2010 | Wernersson |
| 7,756,354 | B2 | 7/2010 | Washisu |
| 7,783,188 | B2 | 8/2010 | Clark |
| 7,986,853 | B2 | 7/2011 | Washisu |
| 8,854,536 | B2 | 10/2014 | Ogasawara |
| 8,964,062 | B1 | 2/2015 | Neglur |
| 9,001,226 | B1 | 4/2015 | Ng et al. |
| 9,531,961 | B2 | 12/2016 | Rivard et al. |
| 9,819,849 | B1 | 11/2017 | Rivard et al. |
| 9,912,928 | B2 | 3/2018 | Rivard et al. |
| 9,917,995 | B2* | 3/2018 | Falk ................. H04N 5/04 |
| 9,998,721 | B2 | 6/2018 | Rivard et al. |
| 10,044,941 | B2 | 8/2018 | Falk |
| 10,110,870 | B2 | 10/2018 | Rivard et al. |
| 10,129,514 | B2 | 11/2018 | Rivard et al. |
| 10,200,663 | B2 | 2/2019 | Saito et al. |
| 10,375,315 | B2 | 8/2019 | Falk |
| 10,375,369 | B2 | 8/2019 | Rivard et al. |
| 10,455,130 | B2 | 10/2019 | Falk |
| 10,469,714 | B2 | 11/2019 | Rivard et al. |
| 10,477,077 | B2 | 11/2019 | Rivard et al. |
| 10,742,892 | B1 | 8/2020 | Le et al. |
| 10,904,505 | B2 | 1/2021 | Rivard et al. |
| 2004/0239767 | A1 | 12/2004 | Stavely et al. |
| 2007/0025270 | A1 | 2/2007 | Sylvain |
| 2007/0025720 | A1 | 2/2007 | Raskar et al. |
| 2008/0298793 | A1 | 12/2008 | Clark |
| 2009/0129634 | A1 | 5/2009 | De Waele |
| 2009/0135262 | A1 | 5/2009 | Ogasawara |
| 2009/0160970 | A1 | 6/2009 | Fredlund et al. |
| 2009/0196595 | A1 | 8/2009 | Okubo |
| 2010/0008658 | A1 | 1/2010 | King |
| 2010/0026853 | A1 | 2/2010 | Mokhnatyuk |
| 2010/0124041 | A1 | 5/2010 | Druchinin |
| 2010/0124412 | A1 | 5/2010 | King |
| 2010/0202767 | A1 | 8/2010 | Shirakawa |
| 2010/0290771 | A1 | 11/2010 | Clark |
| 2011/0123185 | A1 | 5/2011 | Clark |
| 2011/0157408 | A1 | 6/2011 | Steinberg et al. |
| 2011/0188845 | A1 | 8/2011 | Hanayama et al. |
| 2012/0033959 | A1 | 2/2012 | King |
| 2012/0044380 | A1 | 2/2012 | Imai |
| 2012/0045193 | A1 | 2/2012 | King |
| 2012/0127334 | A1 | 5/2012 | Imai |
| 2012/0140088 | A1 | 6/2012 | Clark |
| 2012/0177352 | A1 | 7/2012 | Pillman et al. |
| 2012/0321287 | A1 | 12/2012 | King et al. |
| 2013/0069559 | A1 | 3/2013 | Li et al. |
| 2013/0128101 | A1 | 5/2013 | Midorikawa |
| 2013/0300894 | A1 | 11/2013 | Imai et al. |
| 2014/0016026 | A1 | 1/2014 | Wolfe et al. |
| 2014/0347554 | A1 | 11/2014 | Shirakawa |
| 2015/0116586 | A1 | 4/2015 | Mahowald |
| 2015/0262024 | A1 | 9/2015 | Braithwaite et al. |
| 2016/0021292 | A1 | 1/2016 | Zhang |
| 2016/0198078 | A1* | 7/2016 | Falk ................. H04N 5/067 348/371 |
| 2016/0232672 | A1 | 8/2016 | Rezaiifar |
| 2016/0248960 | A1 | 8/2016 | Falk |
| 2017/0332131 | A1 | 11/2017 | Opsenica et al. |
| 2017/0374265 | A1* | 12/2017 | Finlow-Bates ......... H04N 5/06 |
| 2018/0343374 | A1 | 11/2018 | Tamura |
| 2018/0359411 | A1 | 12/2018 | Kohstall et al. |
| 2019/0037018 | A1* | 1/2019 | Scurrell ................. H04L 67/10 |
| 2019/0124252 | A1* | 4/2019 | Suzuki ................. H04N 5/2353 |
| 2020/0059575 | A1 | 2/2020 | Rivard et al. |
| 2020/0267299 | A1 | 8/2020 | Le et al. |
| 2021/0274142 | A1 | 9/2021 | Rivard et al. |
| 2022/0053121 | A1 | 2/2022 | Falk et al. |
| 2022/0150407 | A1 | 5/2022 | Stenbacka |

FOREIGN PATENT DOCUMENTS

| | | |
|---|---|---|
| CN | 1574899 A | 2/2005 |
| CN | 1645914 A | 7/2005 |
| CN | 1704835 A | 12/2005 |
| CN | 101048796 A | 10/2007 |
| CN | 201083935 Y | 7/2008 |
| CN | 101536493 A | 9/2009 |
| CN | 102143320 A | 8/2011 |
| CN | 201936103 U | 8/2011 |
| CN | 102447834 A | 5/2012 |
| CN | 102879977 A | 1/2013 |
| CN | 103076708 A | 5/2013 |
| CN | 103297684 A | 9/2013 |
| CN | 203407048 U | 1/2014 |
| CN | 105556384 A | 5/2016 |
| CN | 105579901 A | 5/2016 |
| CN | 105635599 A | 6/2016 |
| CN | 105657281 A | 6/2016 |
| CN | 106027912 A | 10/2016 |
| CN | 106210550 A | 12/2016 |
| CN | 106576155 A | 4/2017 |
| CN | 107079193 A | 8/2017 |
| CN | 107209940 A | 9/2017 |
| CN | 107395997 A | 11/2017 |
| CN | 107534738 A | 1/2018 |
| CN | 108012134 A | 5/2018 |
| CN | 109644224 A | 4/2019 |
| CN | 113454530 A | 9/2021 |
| EP | 1278373 A2 | 1/2003 |
| EP | 3047333 A1 | 7/2016 |
| EP | 3047334 A1 | 7/2016 |
| GB | 2154341 | 9/1985 |
| GB | 2477406 | 8/2011 |
| JP | S 63-276039 A | 11/1988 |
| JP | 2004-029184 A | 1/2004 |
| JP | 2017-121029 A | 7/2017 |
| TW | 200900830 A | 1/2009 |
| WO | WO 2015/038047 A1 | 3/2015 |
| WO | WO 2015/038061 A1 | 3/2015 |
| WO | WO 2015/047150 A1 | 4/2015 |
| WO | WO 2017/030777 A1 | 2/2017 |
| WO | WO 2017/134933 A1 | 8/2017 |
| WO | WO 2017/134933 A1 | 10/2017 |
| WO | WO 2018/005765 A1 | 1/2018 |
| WO | WO 2018/017625 A1 | 1/2018 |
| WO | WO 2019/022243 A1 | 1/2019 |

OTHER PUBLICATIONS

International Search Report and Written Opinion of the International Searching Authority for International Application No. PCT/SE2019/050829, dated Nov. 18, 2019, in 19 pages.

International Search Report for International Application No. PCT/SE2014/051072, dated Jan. 9, 2015, in 5 pages.

International Written Opinion for International Application No. PCT/SE2014/051072, dated Jan. 9, 2015, in 5 pages.

International Preliminary Reporton Patentability for International Application No. PCT/SE2014/051072, dated Sep. 8, 2015, in 6 pages.

Extended European Search Report in Patent Application No. 14844738.6, dated May 2, 2017, in 10 pages.

International Search Report for International Application No. PCT/SE2014/050224, dated Nov. 14, 2014, in 5 pages.

(56) References Cited

OTHER PUBLICATIONS

International Written Opinion for International Application No. PCT/SE2014/050224, dated Nov. 14, 2014, in 5 pages.
International Preliminary Report on Patentability for International Application No. PCT/SE2014/050224, dated Aug. 14, 2015, in 12 pages.
Extended European Search Report in Patent Application No. 14844826.9, dated Apr. 13, 2017, in 8 pages.
International Search Report for International Application No. PCT/SE2014/050225, dated May 27, 2014, in 5 pages.
International Written Opinion for International Application No. PCT/SE2014/050225, dated May 27, 2014, in 5 pages.
International Preliminary Report on Patentability for International Application No. PCT/SE2014/050225, dated Sep. 8, 2015, in 6 pages.
International Search Report and Written Opinion of the International Searching Authority for International Application No. PCT/SE2019/050850, dated Nov. 26, 2019, in 17 pages.
International Search Report and Written Opinion of the International Searching Authority for International Application No. PCT/SE2020/050070, dated Aug. 4, 2020, in 12 pages.
Swedish Search Report for Swedish Patent Application No. 1950126-1, dated Aug. 7, 2019, in 12 pages.
Extended European Search Report for European Patent Application No. 19861059.4, dated Apr. 28, 2022, in 8 pages.

\* cited by examiner

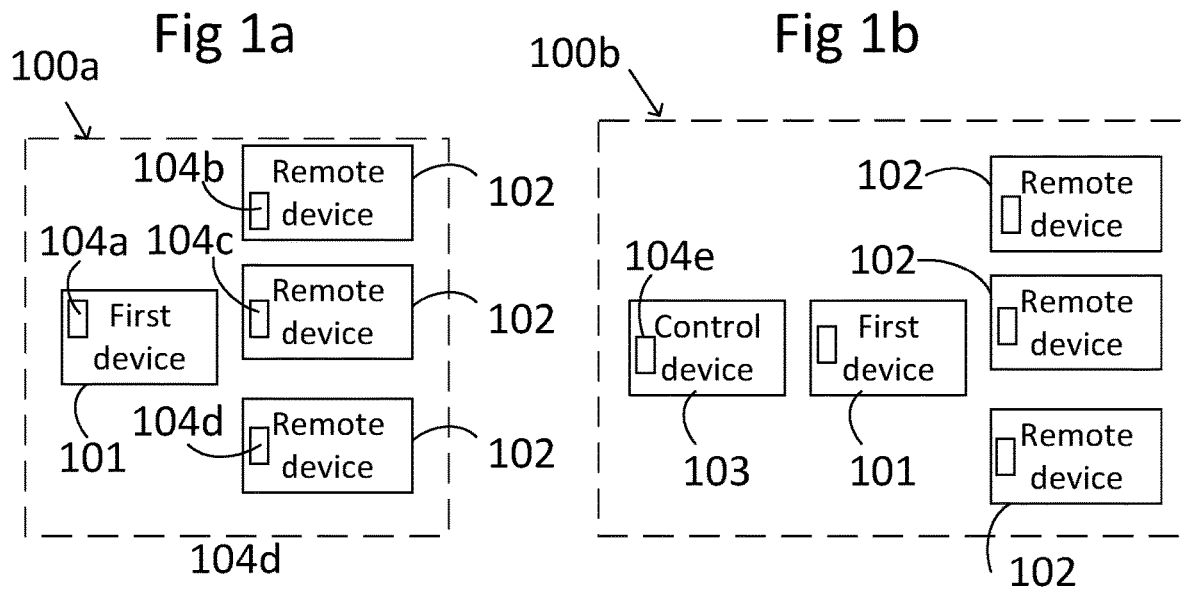
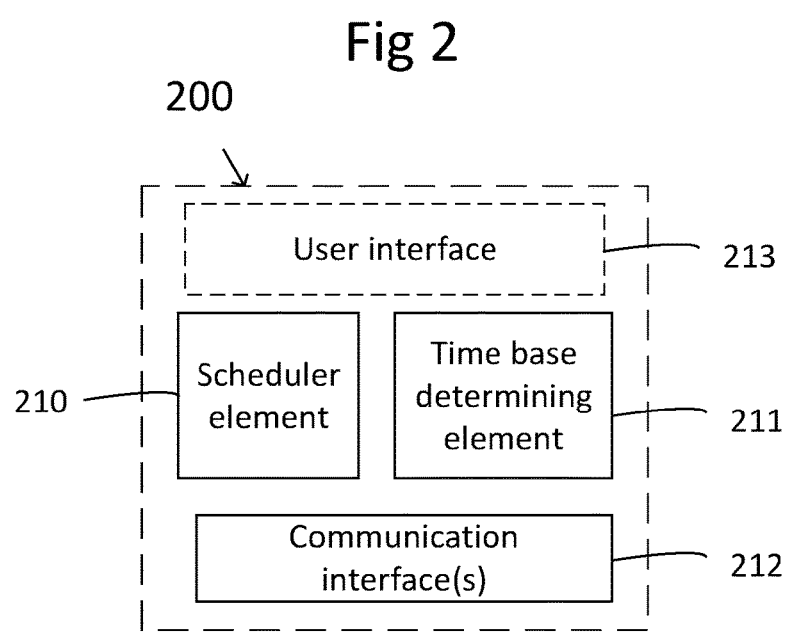

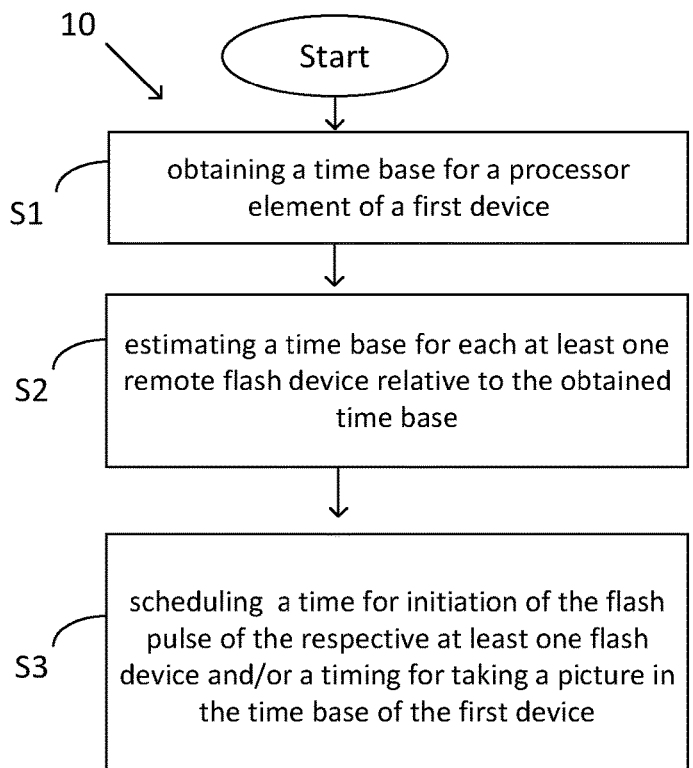
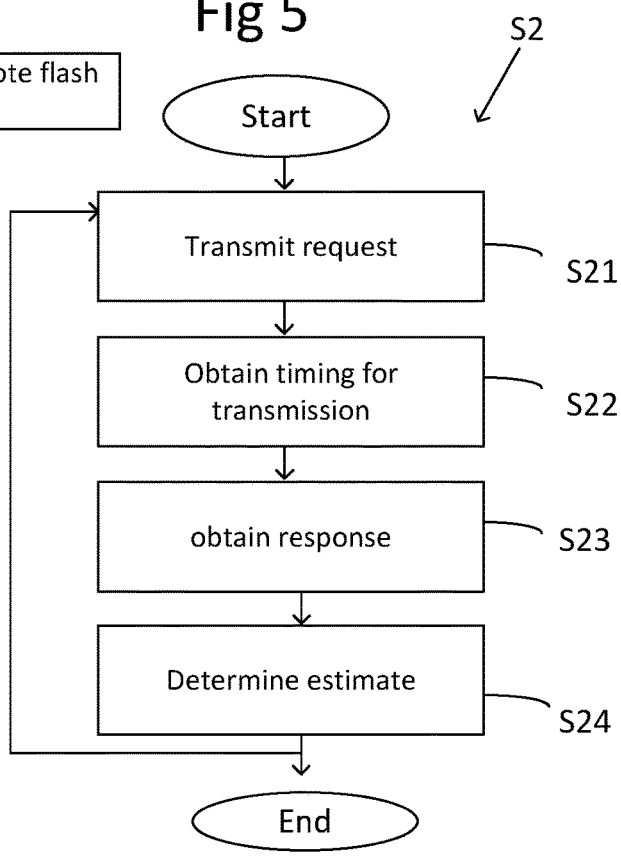

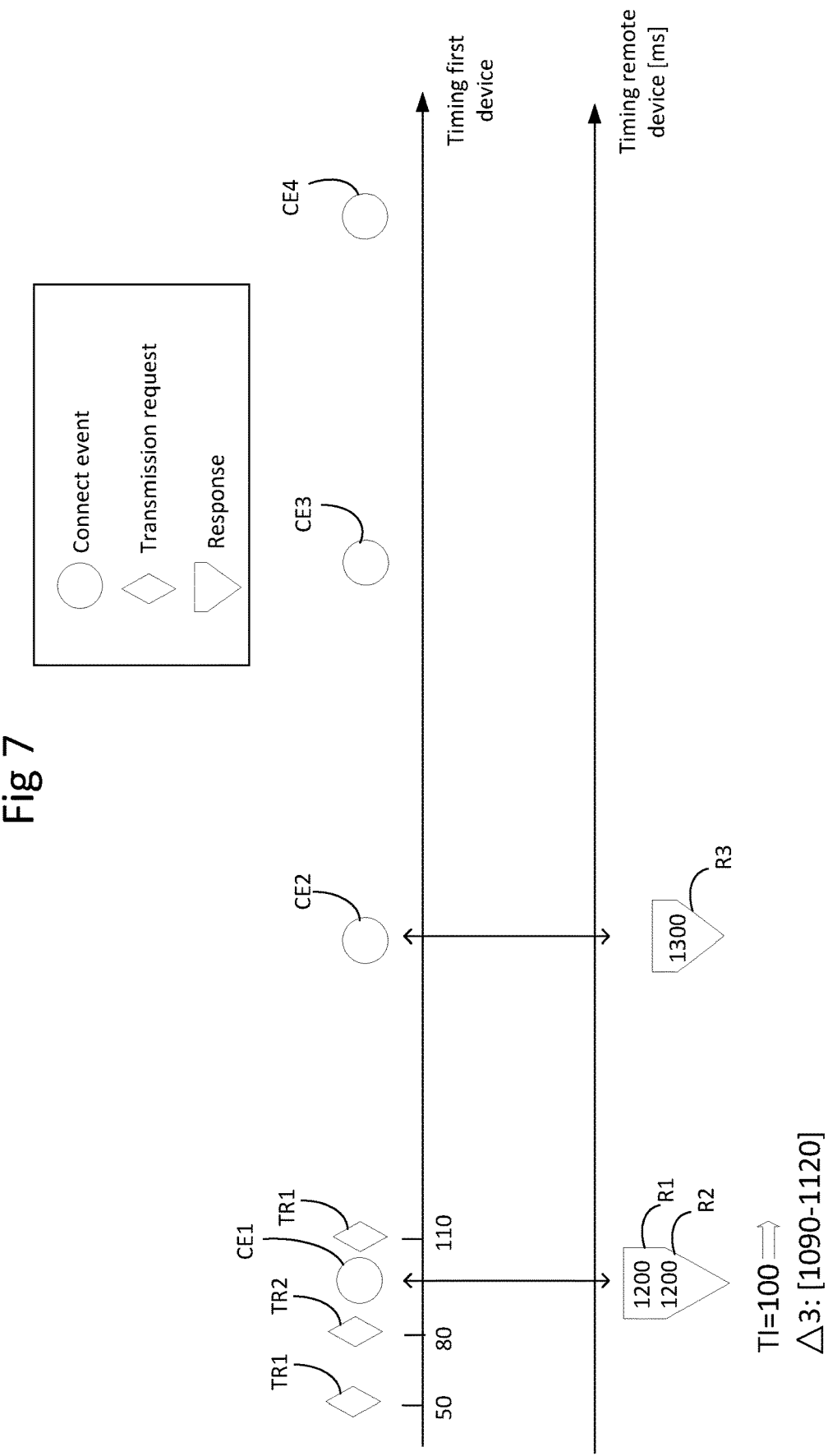

COMPUTER IMPLEMENTED METHOD AND A SYSTEM FOR COORDINATING TAKING OF A PICTURE USING A CAMERA AND INITIATION OF A FLASH PULSE OF AT LEAST ONE FLASH DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates to photographing and particularly to lightning of a scene when the time of taking a picture of the scene.

Description of the Related Art

When it is desired to provide additional light to a scene to be photographed, a flash device may be used to provide the additional light to the scene. The camera used for taking the photography may be arranged to provide a sync signal to the flash device when the photographer takes a picture to activate the flash device.

SUMMARY OF THE INVENTION

An object of the invention is to improve control in lightning a scene at the time of taking a picture of the scene.

This object has been achieved by means of a computer-implemented method for coordinating taking of a picture using a camera and initiation of a flash pulse of at least one flash device.

In accordance with this method, taking of pictures with a camera is coordinated with obtaining of a flash pulse with one or a plurality of flash devices. The coordination may be made such that the camera takes the picture at the same point in time or near the same point in time as the respective flash pulse is emitted. Alternatively, the coordination may be made such that there is a predetermined relation between taking the picture and the obtaining of the flash pulse of the respective flash device.

The method comprises the steps of obtaining a time base for a processor element of the first device; estimating a time base for a processor element of each at least one remote device in relation to the time base of the processor element of the first device; scheduling a timing for initiation of the flash pulse of the respective at least one flash device and/or a timing for initiation of taking a picture using the camera in the time base of the first device so that the coordination with the timing for taking the picture is obtained; and obtaining at the respective remote device of the system the scheduled timing of initiation of the remote device in the time base of that device.

Thereby, the timing of initiation of flash pulses from each of one or a plurality of flash devices and the taking of pictures using the camera may be coordinated. The coordination of the timing of initiation of flash pulses from each of one or a plurality of flash devices and the taking of pictures using the camera may involve determining timings for taking the picture and timings for initiating a flash pulse from the respective flash device.

With the coordination as defined above the timing of the flash pulses in relation to the taking of the images may be coordinated so that the flash pulses take place at a desired timing in relation to the taking of the picture. Further, when a plurality of flash devices are used, they may be coordinated to flash at a desired timing in relation to each other and in relation to the taking of a picture.

Characteristically the time base of the first device and the at least one flash device are different. Thus, a clock of a processor element of the first device has characteristically a different timing than a clock of the respective remote device. This instantaneous difference between the readings of the clock of the first device and the respective remote device is called their skew or clock skew. Thus, there is characteristically a skew between the time base of the first device and the at least one flash device. Thus, the skew may be taken into account when coordinating timing of initiation of flash pulses from each of one or a plurality of flash devices and the taking of pictures using the camera.

Further, the time bases may drift in relation to each other with time. Therefore, the estimation of the time base for a processor element of each at least one remote device in relation to the time base of the processor element of the first device may be performed continuously or repeatedly.

The present disclosure further relates to a control system 200 for coordinating taking of a picture using a camera and initiation of a flash pulse of at least one flash device. The control system is arranged to control operation of a first device having a processor element operating in a first time base and at least one remote device having a processor element operating in a respective second time base. The control system comprises a time base estimating element arranged to estimate a relation between the first and the respective second time bases. The control system comprises further a scheduler element arranged to schedule in the time base of the first device a timing for initiation of the flash pulse of the respective at least one flash device and/or a timing for initiation of taking a picture using the camera so that the coordination with the timing for taking the picture is obtained. The control system comprises further a communication interface arranged to transmit to the respective remote device the scheduled timing of that remote device.

The present disclosure further relates to a camera device arranged to coordinate taking of a picture using said camera device and initiation of a flash pulse of at least one remote flash device. The camera device has a processor element operating in a first time base, wherein the at least one remote flash device has a processor element operating in a respective second time base. The camera device comprises at least a part of a time base estimating element arranged to estimate a relation between the first and the respective second time bases, a scheduler element arranged to schedule in the first time base a timing for initiation of the flash pulse of the respective at least one remote flash device so that coordination with the timing for taking the picture is obtained, and a communication interface arranged to transmit to the respective remote flash device the scheduled timing of that remote flash device.

The camera device may be a camera phone or tablet which may be arranged to communicate with the at least one remote flash device via a Bluetooth interface.

The present disclosure further relates to a flash device arranged to coordinate initiation of a flash pulse of the flash device with taking of a picture using a remote camera device, said flash device having a processor element operating in a first time base, wherein the remote camera device having a processor element operating in a second time base. The flash device comprises at least a part of a time base estimating element arranged to estimate a relation between the first and the respective second time bases, a scheduler element arranged to schedule in the time base of the flash device a timing for taking a picture using the camera device so that the coordination with the initiation of the flash pulse is obtained, and a communication interface arranged to transmit to the camera device the scheduled timing of that remote camera device.

The present disclosure further relates to a computer program product for performing the method for coordinating taking of a picture using a camera and initiation of a flash pulse of at least one flash device as disclosed herein.

BRIEF DESCRIPTION OF THE DRAWINGS

FIGS. 1a and 1b is a scheme illustrating an example of a system for coordinating taking of a picture using a camera and initiation of a flash pulse of at least one flash device.

FIG. 2 is a scheme illustrating an example of a control system for coordinating taking of a picture using a camera and initiation of a flash pulse of at least one flash device.

FIG. 4 is a flow chart illustrating an example of a computer-implemented method for coordinating taking of a picture using a camera and initiation of a flash pulse of at least one flash device.

FIG. 5 is a flow chart illustrating an example of step for estimating a time base for each at least one remote device relative to an obtained time base of the first device performed in the method of FIG. 3.

FIG. 7 is a time scheme illustrating a modified detailed example of a step for estimating a time base for a remote device relative to a time based for a first device.

DETAILED DESCRIPTION

Figure 3A:
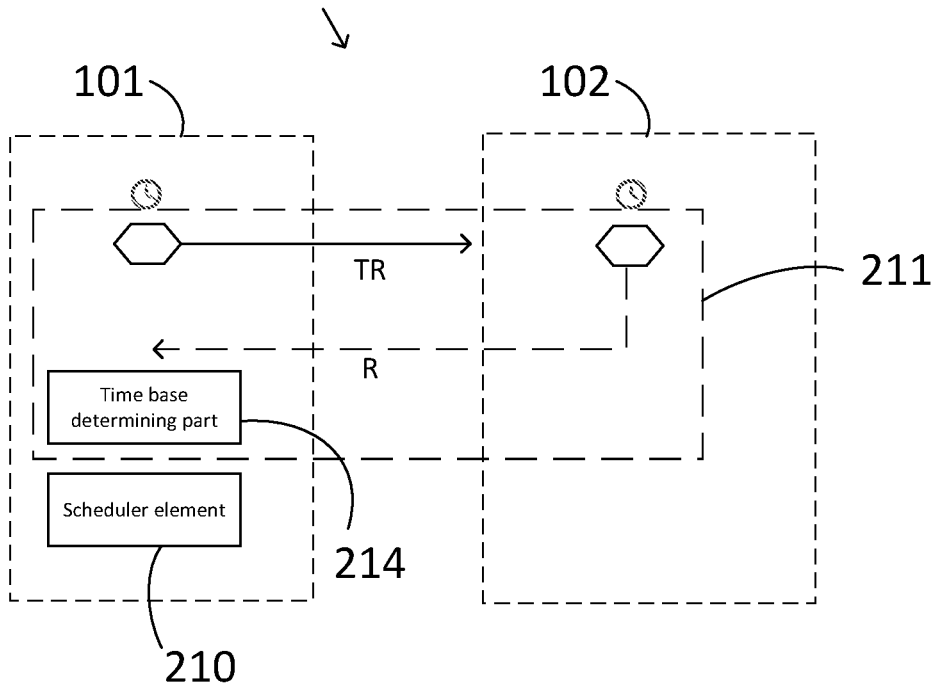
FIGS. 3a and 3b is a scheme schematically illustrating some aspects of the control system of FIG. 2.

In FIGS. 1a and 1b examples of systems 100a, 100b for coordinating taking of a picture using a camera and initiation of a flash pulse of at least one flash device are illustrated.

In FIG. 1a, the system 100a comprises a first device 101 and one or a plurality of remote devices 102. In one example, the camera is implemented in the first device 101 and flash device(s) 102 are implemented in the remote device(s). In another example, a flash device is implemented in the first device 101 and the remote device(s) comprises the camera and additional flash device(s), if any. In yet another example, the first device is a control device and the camera and flash devices are implemented in the remote devices.

In FIG. 1b, the system 100b comprises a control device 103, a first device 101 and one or a plurality of remote devices 102. At least some functionality for coordinating taking of a picture using a camera and initiation of a flash pulse of at least one flash device may be implemented in the control device 103. In one example, the camera is implemented in the first device 101 and flash device(s) are implemented in the remote device(s) 102. In another example, a flash device is implemented in the first device 101 and the remote device(s) 102 comprises the camera and additional flash device(s), if any.

Each device of the system 100a, 100b has a control element (not shown) for controlling that device. The control element is associated to an internal clock 104a, 104b, 104c, 104d, 104e of that device. The internal clock 104a, 104b, 104c, 104d, 104e forms a time for that device. Control by means of the control element of the respective device is performed in the time base of that device.

FIG. 2 illustrates a control system 200 for coordinating taking of a picture using a camera and initiation of a flash pulse of at least one flash device. The control system is implemented in a system including a first device and at least one remote device. For example, the control system may be implemented in a system having at least some devices as discussed in relation to FIGS. 1a and 1b. For example, the elements of the control system 200 may be mainly or in part implemented in a first device, as discussed in relation to FIGS. 1a and 1b. Some elements or all elements of the control system may instead or in addition thereto be mainly or in part implemented in a control device as discussed in relation to FIGS. 1a and 1b.

The control system 200 comprises a scheduler element 210 and a time base estimating element 211. The control system 200 further comprises communication interface(s) 212 for communication between different devices of the system.

The control system 200 may further comprise a user interface 213 for user requests. The user interface comprises a function for user request to take a picture. The user interface may therefore for example comprise a pushbutton of a camera. When the camera is implemented in a wireless device such as a camera phone or tablet, the "pushbutton" is then implemented in the user interface of the wireless device.

The scheduler element 210 is arranged to, upon request, scheduling a timing for initiation of the flash pulse of the respective at least one flash device and/or a timing for taking a picture using the camera in the time base of the first device so that the coordination with the timing for taking the picture is obtained and obtaining the scheduled timings of initiation of the respective device in the time base of that device.

The request is characteristically obtained via the "camera pushbutton" of the user interface 213.

The scheduled timing(s) are fed from the scheduler element 210 to the devices of the system 100a, 100b. The scheduled timing(s) for those devices, which are remote devices, are fed to the communication interface 212 for transmission of the scheduled timings to the respective remote device. Any scheduled timing associated to a flashlight or picture taking device in which the scheduler element is implemented is also communicated to that flashlight or picture taking function.

The scheduled timing(s) fed to the communication interface 212 is/are transmitted to the remote device to which the particular timing is associated.

The time base estimating element 211 is arranged to obtaining a time base for a processor element of the own device 101 and estimating a time base for each at least one remote device 102 relative to the obtained time base of the own device 101. Generally, the estimation of time base comprises transmitting at least one request for time information relating to said at least one remote device, obtaining a timing of the transmission of the request for time information based on the obtained time reference, receiving a response from each said at least one remote device comprising the requested time information in a time base of that remote device, and determining the estimate of the time base for each at least one remote device based on the obtained timing of the transmission of the request for time information and the time information comprised in the response from respective remote device. Examples of how the time bases may be estimated will be discussed more in detail below.

Figure 3B:
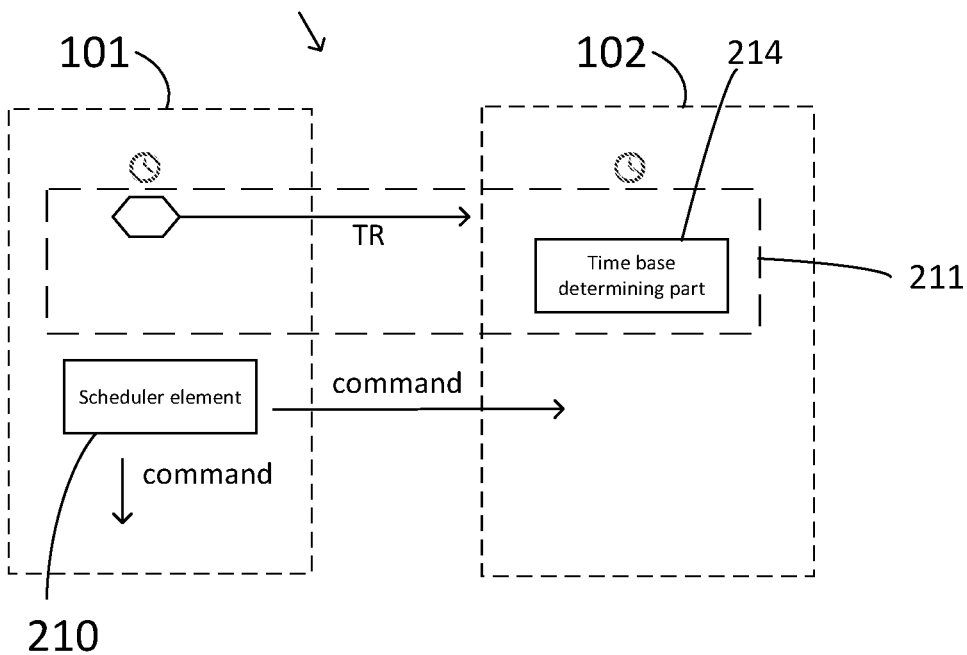

FIGS. 3a, 3b disclose an aspect of the control systems 200 for coordinating taking of a picture using a camera and initiation of a flash pulse of at least one flash device as exemplified in FIG. 2. The control system is arranged to control operation of a first device 101 having a processor element operating in a first time base and at least one remote device 102 having a processor element operating in a respective second time base.

The first device 101 may be a camera phone or tablet. The first device may be a flash device.

The at least one remote device 102 may comprise at least one remote flash device. The at least one remote device may comprise the camera phone or tablet.

The control system 200 comprises a time base estimating element 211 arranged to estimate a relation between the first and the respective second time bases. The control system comprises further a scheduler element 210 arranged to schedule in the time base of the first device a timing for initiation of the flash pulse of the respective at least one flash device and/or a timing for initiation of taking a picture using the camera so that the coordination with the timing for taking the picture is obtained. Communication between the first device and the at least one remote device is performed over a communication interface (not shown). The communication interface may be a wireless interface such as a Bluetooth interface.

In the example of FIG. 3a, the time base estimating element 211 is arranged to transmit from the first device to the at least one remote device at least one request TR over said communication interface. The request is a request for timing information relating to said at least one remote device. The request may comprise an identity uniquely identifying the request. Further, the time base estimating element is at the first device arranged to obtain a timing ($T_{TR1}$, $T_{TR2}$, $T_{TR3}$) of the transmission of the request for time information in the obtained first time base.

In response to receipt of the transmission request TR, the remote device is arranged to provide the requested time information in the time base of that remote device. The time base estimating element is at the remote device further arranged to form a response (R) comprising the requested time information and to transmit the formed response to the first device. The response comprises characteristically also the identity uniquely identifying the request. Thereby, pairing of the request with its corresponding response is facilitated.

A time base determining pat 214 of the time base estimating element is arranged to determine the estimate of the second time base of the processing element of each at least one remote device in relation to the time base of the processor element of the first device based on the obtained timing of the transmission of the request for time information and the time information comprised in the response (R) from the respective remote device.

The scheduler element 210 is arranged to feed to the communication interface for further communication to the respective remote device the scheduled timing for the respective remote device in the second time base.

In the example of FIG. 3b, the time base estimating element 211 is arranged to transmit from the first device to the at least one remote device at least one transmission request TR over said communication interface. The transmission request is a request for timing information relating to said at least one remote device. Further, the time base estimating element 211 is at the first device 101 arranged to obtain a timing of the transmission of the request for time information in the obtained first time base and to include the obtained timing of the transmission of the request in the request.

In response to receipt of the transmission request TR, the remote device is arranged to obtain the requested time information in the time base of that remote device.

The time base determining part 214 of the time base estimating element is in this example arranged at the respective remote device 102. The time base determining part is arranged to determine the estimate of the time base of the processing element of its remote device in relation to the time base of the processor element of the first device based on the obtained timing of the transmission of the request for time information and the obtained requested time information.

The scheduler element 210 is arranged to feed to the communication interface for further communication to the respective remote device the scheduled timing for the respective remote device in the first time base. The respective remote device may then convert the scheduled timing to a timing in the time base of that remote device.

In FIG. 4, an example of a computer implemented method 10 for coordinating taking of a picture using a camera and initiation of a flash pulse of at least one flash device is illustrated.

The method is adapted for a system including a first device and at least one remote device. The method comprises the steps of obtaining S1 a time base for a processor element of the first device.

The method further comprises a step of estimating S2 a time base for a processor element of each at least one remote device in relation to the time base of the processor element of the first device.

The communication between the first device and at least one remote device may be performed over a wireless channel with predetermined communication timings, so called connect events. The estimation S2 of a time base for each at least one remote device is performed also based on the predetermined communication timings. Further, the time bases may drift in relation to each other with time. Therefore, the estimation S2 of the time base for a processor element of each at least one remote device in relation to the time base of the processor element of the first device may be performed continuously or repeatedly. The method further comprises a step of scheduling S3 a timing for initiation of the flash pulse of the respective at least one flash device and/or a timing for taking a picture using the camera in the time base of the first device so that the coordination with the timing for taking the picture is obtained. The scheduling may be performed at least in part in the first device. The scheduling may be performed at least in part in a control device in communication with the first device. The scheduling characteristically takes place when the user indicates that he/she wishes to take a picture via a user interface at the first device or control device associated thereto. The indication may in another example be obtained by means of an indication via a user interface of one of the remote device(s). The scheduling may take account to any delays within the respective devices to initiate taking of the picture and/or initiating the flash light. The scheduling may also or instead take into account timings of connect events for communication between the first device and the respective remote device. The timings for connect events may be provided in the step of estimating S2 the time base for the respective remote device; this is further illustrated in relation to FIGS. 6 and 7.

A timing relating to scheduling of the first device may be obtained. The timing relating to scheduling of the first device is then fed to control hardware/software for control of the first device.

The method further comprises a step of obtaining S4 at the respective remote device of the system the scheduled timing of initiation of the remote device in the time base of that device. The scheduled timing is communicated from the first device to the respective remote device.

In FIG. 5, an example of a step of estimating S2 a time base for a processor element of each at least one remote device in relation to the time base of the processor element of the first device of a computer implemented method as discussed in relation to FIG. 4 is disclosed. In the illustrated example, the step of estimating S2 a time base for a processor element of each at least one remote device in relation to the time base of the processor element of the first device comprises the steps of transmitting (S21) at least one request (TR1, TR2, TR3) for time information relating to said at least one remote device, obtaining (S22) a timing ($T_{TR1}$, $T_{TR2}$, $T_{TR3}$) of the transmission of the request for time information based on the obtained time base of the first device, obtaining (S23) a response (R1, R2, R3) for each said at least one remote device (102) comprising the requested time information in a time base of that remote device, and determining (S24) the estimate of the time base of the processing element of each at least one remote device in relation to the time base of the processor element of the first device based on the obtained timing of the transmission of the request for time information and the time information comprised in the response for the respective remote device.

The obtained response (R1, R2, R3) for each said remote device may be transmitted to the first device. The determination S24 of the estimate of the time base for each at least one remote device is then performed at the first device. Scheduled timings are then transmitted to the respective remote device in the time base of that remote device.

The at least one request (TR1, TR2, TR3) may comprise the obtained timing ($T_{TR1}$, $T_{TR2}$, $T_{TR3}$) of the transmission of the request. The determination (S24) of the estimate of the time base of the remote device in relation to the time base of the first device may then be performed at the remote device based on the obtained timing ($T_{TR1}$, $T_{TR2}$, $T_{TR3}$) of the transmission of the request and the obtained response (R1, R2, R3). The scheduled timings may then be transmitted to the respective remote device in the time base of the first device.

The communication between the first device and at least one remote device may be performed over a wireless channel with predetermined communication timings, so called connect events. Communication may be performed according to a Bluetooth protocol.

The predetermined communication timings may be unknown. The estimation of a time base for each at least one remote device may then be performed also based on the predetermined communication timings.

However, the predetermined communication timings may be unknown. A plurality of requests (TR1, TR2, TR3) for timing information may then be transmitted S21. The determination S24 of the estimate of the time base for each at least one remote device may then comprise determining a timing relation between the timing ($T_{TR1}$, $T_{TR2}$, $T_{TR3}$) of the transmission of each request and the communication timings based on the information in the respective obtained response.

The timing of the transmittal of a next request for timing information may be selected based on the determined timing relation between the timing ($T_{TR1}$, $T_{TR2}$, $T_{TR3}$) of the transmission of the preceding request(s) and the communication timings so as to narrow a time window within which the communication event occurs. It may be that time information relating to directly preceding request(s) are not available. Then, earlier requests may be used in the selection.

The determining S24 of the estimate of the time base may comprise determining a time interval within which the time base lies based on a time window within which it has been determined that the communication event occurs. The requests for timing information may be repeatedly transmitted until the time interval within which the time base lies is within predetermined boundaries.

Figure 6:
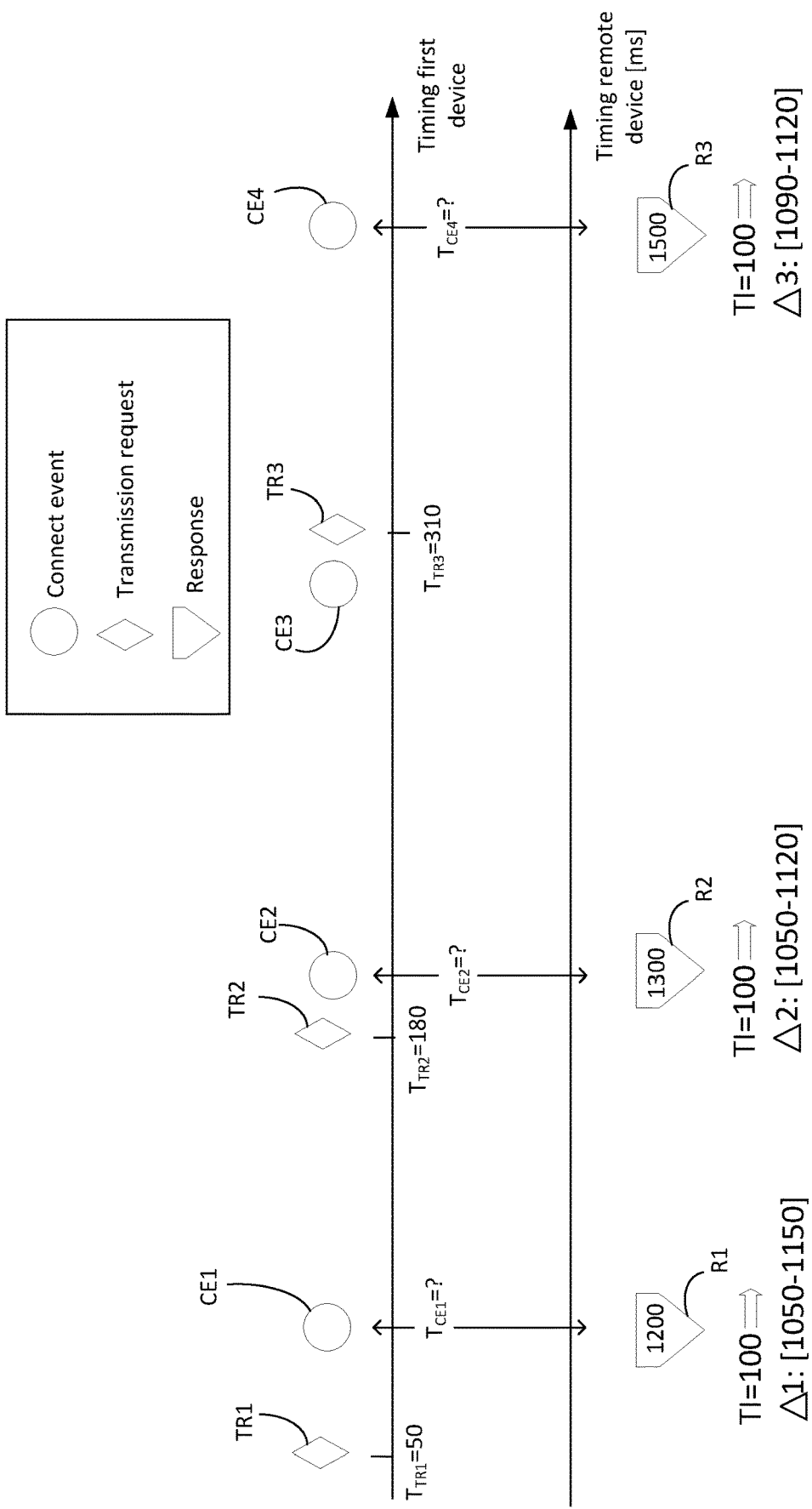
FIG. 6 is a time scheme illustrating a detailed example of a step for estimating a time base for a remote device relative to a time based for a first device.

In FIG. 6, one example of a scheme for estimating the time base for a remote device is schematically illustrated. The time base is estimated based on an obtained timing of a transmission of a request for time information from a first device to the remote device and the time information comprised in the response from the remote device.

In the illustrated example a time interval TI between connect events, i.e. timings when the first device communicates with the remote device is known. The example is illustrated in relation to an example wherein the connect time interval TI is 100; this connect time interval is only set for illustrative purposes. The connect time interval TI may for example be given in microseconds.

In the illustrated example, the first device transmits a request for time information at a timing $T_{TR1}=50$. In the illustrated example, this request for time information is denoted TR1. The request for time information is communicated to the remote device during a next connect event CE1. The timing $T_{CE1}$ of the next connect event CE1 is not known. However, as the time interval is known, it is known that the next connect event C1 will occur within the connect timing interval TI, i.e. within 100 microseconds.

In response to receipt of the request for time information, the remote device forms a response R1 to the request for time information. The response R1 comprises time information indicating the time of an internal clock of the remote device. In the illustrated example, the response comprises the time 1200. The time is for example given in microseconds.

Then, a difference between the time of the first device and the remote device may be estimated. The estimated time difference may be given as a time interval.

An upper limit for the time difference interval may be determined based on a time difference between the timing T1 of the transmission of the request and the timing information in the response. Thus, in the illustrate example, an upper limit for the time difference interval is 1200−50=1150 [µs].

Further, as the upper limit has been determined and the connect time interval TI between connect events in this example is known, this may be used for determined a lower limit for the time difference interval, i.e. the lower time limit is 1150−100=1050 [µs]. Thus, the estimation of the difference between the time of the first device and the remote device may be given as a time interval $\Delta 1 \epsilon [1050, 1150]$, i.e. $\Delta 1 = 1100 \pm 50$. However, note that an upper limit can always be estimated, even though the time interval is not known.

The information provided above relating to transmission of the transmission request TR, the formation of the associated response R1 and the time interval T1 may also be used to provide an estimate relating to the timing of the connect events in the time base of the first device. Thus, the timing of the connect event C1 in the time base of the first device may be estimated as $$T_{CE1\_First\ device} \approx "1200 - \Delta \approx 1200 - (1100 \pm 50) \approx 100 \pm 50.$$

Accordingly, the next connect event CE2 in the time based of the first device may be estimated to take place at $T_{CE2\_First\ device} \approx 200 \pm 50$.

The so estimated time difference interval Δ1 may not be satisfactory small. Therefore, the above-described process is repeated one or a plurality of times until the time difference interval is within acceptable boundaries.

Accordingly, in accordance with the illustrated example, the first device transmits a second request for time information. In the illustrated example, the second request for time information is transmitted at a timing $T_{TR2}=180$. In the illustrated example, this request for time information is denoted TR2. The time for transmitting the second request for time information may obtained arbitrary or selected. If selected, the time may be selected based on the connect time interval. In the illustrated example, the timing of the transmitting of the second request for time information is selected to be incremented in relation to the first request TR1 for time information with a time larger than the connect time interval TI. Thus, the second request for time information is selected to try to get a bit closer to the timing of the connect event than the first request for time information. It may be that time information relating to directly preceding request(s) are not available. Then, earlier requests may be used in the selection.

The request for time information is communicated to the remote device during a next connect event CE2.

In response to receipt of the second request for time information, the remote device forms a response R2 to the second request TR2 for time information. The response R2 comprises as described above time information indicating the time of an internal clock of the remote device. In the illustrated example, the response comprises the time 1300 [µs].

Then, the estimation of the time difference between the time of the first device and the remote device may be updated.

As the time information included in the second response R2 differs with an amount corresponding to the connect time interval TI between connect events, in this case 100 [µs], it can be concluded that the response was received in a connect event directly following the first connect event.

The upper limit for the time difference interval may be updated based on a time difference between the timing $T_{TR2}$ of the transmission of the request TR2 and the timing information of the formed response R2.

Thus, in the illustrate example, an upper limit for the time difference is 1300−180=1120 [µs].

At this stage, no information has been obtained for updating the lower time limit.

Thus, the time difference between the time of the first device and the remote device has now been updated.

Thus, the estimation of the difference between the time of the first device and the remote device has been updated. The time difference may be given as a time difference interval $\Delta 2 \in [1050, 1120]$, i.e. $\Delta 2 = 1085 \pm 35$.

Further, the timing $T_{CE2}$ of the connect event C2 in the time base of the first device may be estimated as $$T_{CE2\_First\ device} \approx 1300 - \Delta 2 \approx 215 \pm 35.$$

Accordingly, the next connect event CE3 in the time based of the first device may be estimated to take place at $T_{CE3\_First\ device} \approx 315 \pm 35$.

The so determined time difference interval may not be satisfactory small. Therefore, the above-described process may be repeated again to obtain satisfactory accuracy.

Accordingly, in accordance with the illustrated example, the first device transmits a third request TR3 for time information. In the illustrated example, the third request TR3 for time information is transmitted at a timing $T_{TR3}=310$. In the illustrated example, the timing $T_{TR3}$ of the transmission of the third request TR3 for time information is obtained arbitrary or selected. If selected, the timing $T_{TR3}$ of the transmission of the third request TR3 may be incremented in relation to the second request for time information TR2 with a time larger that the connect time interval TI. Thus, the third request for time information is then selected to try to get a bit closer to the timing of the connect event than the second request for time information. It may be that time information relating to directly preceding request(s) are not available. Then, earlier requests may be used in the selection.

The request TR3 for time information is communicated to the remote device during a connect event CE4.

In response to receipt of the third request for time information TR3, the remote device forms a response to the third request for time information TR3. The response comprises as described above time information indicating the time of an internal clock of the remote device. In the illustrated example, the response comprises the time 1500 [µs].

Then, the estimation of the time difference between the time of the first device and the remote device may be updated.

As the time information included in the third response differs with an amount corresponding to two connect time intervals TIs between connect events, in this case 200 [µs], it can be concluded that the response was not formed in a connect event CE3 directly following the second connect event but in a thereafter following connect event CE4. This means that the third request TR3 was transmitted at a timing after the third connect event CE3 or at least so close to the timing of the connect event CE3 that the third request TR3 could not be included in the third connect event CE3.

The lower value for the time difference interval may be updated based on a time difference between the timing T3 of the transmission of the request and the timing information of the of received response R3. The lower limit for the time difference may be updated by determining that the request was transmitted after the timing 1500−310=1190 [µs] in the time base of the remote device and that the lower limit for the time difference then may be updated as the difference between the timing of the third connect event CE in the time base of the remote device and the timing of the transmission of the third request TR3 in the time base of the first device.

In practice, the lower limit for the time limit may be calculated as follows. The time difference between the timing $T_{TR3}$ of the transmission of the request TR3 and the timing information of the formed response R3 is determined as 1500−310=1190. This time difference larger than the previously estimated upper limit, and thus it may be determined that the third request TR3 was transmitted at a timing after the third connect event CE3 or at least so close to the timing of the connect event CE3 that the third request TR3 could not be included in the third connect event CE3

Thus, in the illustrate example, a lower limit for the time difference is 1500−100−310=1090 [µs].

Thus, the estimation of the difference between the time of the first device and the remote device has been updated. The time difference may be given as a time difference interval $\Delta 3 \in [1090, 1120]$, i.e. $\Delta 3 = 1105 \pm 15$.

At this stage, no information has been obtained for updating the upper time limit.

Thus, the time difference between the time of the first device and the remote device has now been updated. In this example, the time difference interval has been updated to be $\Delta 3 \in [1090, 1120]$.

Further, the timing $T_{CE4}$ of the connect event C4 in the time base of the first device may be estimated as $$T_{CE4\_First\ device} \approx 395 \pm 15.$$

Accordingly, a next connect event CE5 in the time based of the first device may be estimated to take place at $T_{CE5\_First\ device} \approx 495 \pm 15$.

The so determined time difference interval may not be satisfactory small. Therefore, the above-described process may be repeated again using timings of transmissions of the requests TRn in order to further narrow the time interval 4.

In FIG. 7, a modified example of a scheme for estimating the time base for a remote device is schematically illustrated.

In line with the example of FIG. 6, the time base is estimated based on an obtained timing $T_{TR}$ of a transmission of a request TR for time information from a first device to the remote device and the time information comprised in the response R from the remote device.

In line with the example of FIG. 6, a connect time interval TI between connect events, i.e. timings when the first device communicates with the remote device may be known. The example is illustrated in relation to an example wherein the connect time interval TI is 100; this time connect time interval is only set for illustrative purposes. TI may for example be given in microseconds.

In accordance with this example, a plurality of transmission requests TR1, TR2, TR3 are transmitted at different, predetermined timings in relation to each connect event. Thereby, the time needed for obtaining a time difference between the first device and the respective remote device may be shortened in relation to the example of FIG. 5. In the illustrated example, a first transmission request TR1, a second transmission request TR2 and a third transmission request TR3 are transmitted at t first timing $T_{TR1}=50$ [μs], a second timing $T_{TR2}=180$ [μs] and a third timing $T_{TR3}=310$ [μs].

The first and second transmission requests TR1, TR2 for time information are communicated to the remote device during a next connect event CE1. However, the third transmission request is not communication at that connect event. The third transmission request is awaiting the thereafter following connect event CE2.

In response to receipt of the first and second transmission requests TR1, TR2 for time information, the remote device forms a response R1, R2 to the respective first and second requests TR1, TR2 for time information. The responses R1, R2 to the respective first and second transmission requests TR1, TR2 comprises time information indicating the time of an internal clock of the remote device. Thus, the response comprises in an example two time indications indicating the same timing. In the illustrated example, the responses comprise the time 1200. The time is for example given in microseconds. The response does not comprise a third time indication as the third transmission request TR3 has not yet been communicated.

Thus, after the first connect event CE1 of this example, the same information is obtained as after a plurality of connect events in FIG. 6.

Then, a difference between the time of the first device and the remote device may be estimated. The estimated time difference may be given as a time interval.

The time difference between the time of the first device and the remote device may then be determined to be $\Delta \in [1090, 1120]$ based on the connect time interval information TI, the timings of the transmission requests ($T_{TR1}=50$, $T_{TR2}=180$, $T_{TR3}=310$) and the information that the first and second responses were received at 1200 in the time base of the remote device in an equivalent manner as described in relation to FIG. 6.

The example illustrated in relation to FIGS. 5 and 6 are merely examples.

In the herein illustrated examples, some algorithm for selection of timings for transmissions of the transmission requests TR may be used for narrowing the time interval $\Delta$. The selection may be based on previous responses to transmission requests. It may be that responses relating to directly preceding request(s) are not available. Then, earlier requests may be used in the selection.

Further, in the herein illustrated examples, communication of the request, formation of the response and communication of the response, when applicable take place within the same connect events. However, this is only an example. For example, the communication of the request and the formation of the response may be arranged to take place in one connect event and the communication of the response, when applicable, takes place in a following connect event. In another example, the communication of the request takes place in one connect event and the communication of the response, when applicable, takes place in a following connect event. The teaching as described herein is applicable to all situations, as long as the scheme for communication and formation of responses is known. Should there be occurrences data falls outside the determined scheme for communication and formation of responses, those data should be ignored.

Further, in the herein illustrated examples, it is assumed that the communication of the transmission request of the first device, the reception of the transmission request at the remote device, the processing of the transmission request at the remote device, the transmission of the response from the remote device and the receipt of the response at the first device is performed momentarily. In order to further improve the estimation of the time difference between the first device and the remote device, any delays in this scheme may be taken into account when estimating the time difference between the first device and the remote device.

Further, the transmission requests may comprise an identity uniquely identifying the request. Transmitted responses then characteristically also comprise the identity uniquely identifying the one or plurality of requests to which the response is associated. Thereby, pairing of the request with its corresponding response is facilitated. When the requests are uniquely identified, this allows for example for discarding retransmissions when estimating the time difference between the first device and the remote device. Precision in the estimation may thereby be improved.

Further, in practice, the clocks of the first device and the remote device will characteristically drift in relation to each other. Therefore, estimation of the time difference between the first device and the remote devices may be performed repeatedly. Thus, the estimation time difference between the first device and the respective remote device may take place continuously or at predetermined time intervals.

What is claimed is:

1. A computer implemented method for coordinating taking of a picture using a camera and initiation of a flash pulse of at least one flash device, said method being adapted for a system including a first device and at least one remote device, said method comprising the steps of
obtaining a time base for a hardware processor of the first device,
estimating a time base for a hardware processor of each at least one remote device in relation to the time base of the hardware processor of the first device,
scheduling a timing for initiation of the flash pulse of the respective at least one flash device and/or a timing for taking a picture using the camera in the time base of the first device so that the coordination with the timing for taking the picture is obtained, and
obtaining at the respective remote device of the system the scheduled timing of initiation of the remote device in the time base of that device,
wherein the estimating of a time base for a hardware processor of each at least one remote device in relation to the time base of the hardware processor of the first device comprises the steps of
transmitting at least one request for time information relating to said at least one remote device,
obtaining a timing of the transmission of the request for time information based on the obtained time reference of the first device,
obtaining a response for each said at least one remote device comprising the requested time information in a time base of that remote device, and
determining the estimate of the time base of the hardware processor of each at least one remote device in relation to the time base of the hardware processor of the first device based on the obtained timing of the transmission of the request for time information and the time information comprised in the response for the respective remote device.

2. The computer implemented method according to claim 1,
wherein the obtained response for each said remote device is transmitted to the first device and the determination of the estimate of the time base for each at least one remote device is performed at the first device, and
wherein the scheduled timing is transmitted to the respective remote device in the time base of that remote device.

3. The computer implemented method according to claim 1,
wherein the at least one request comprises the obtained timing of the transmission of the request and the determination of the estimate of the time base of the remote device in relation to the time base of the first device is performed at the remote device based on the obtained timing of the transmission of the request and the obtained response, and
wherein the scheduled timing is transmitted to the respective remote device in the time base of the first device.

4. Method according to claim 1, wherein the scheduling is performed at least in part in the first device.

5. Method according to claim 1, wherein the scheduling is performed at least in part in a control device in communication with the first device.

6. A computer implemented method for coordinating taking of a picture using a camera and initiation of a flash pulse of at least one flash device, said method being adapted for a system including a first device and at least one remote device, said method comprising the steps of
obtaining a time base for a hardware processor of the first device,
estimating a time base for a hardware processor of each at least one remote device in relation to the time base of the hardware processor of the first device,
scheduling a timing for initiation of the flash pulse of the respective at least one flash device and/or a timing for taking a picture using the camera in the time base of the first device so that the coordination with the timing for taking the picture is obtained, and
obtaining at the respective remote device of the system the scheduled timing of initiation of the remote device in the time base of that device,
wherein the communication between the first device and at least one remote device is performed over a wireless channel with predetermined communication timings,
wherein in the estimation of a time base for each at least one remote device is performed also based on the predetermined communication timings,
wherein when the predetermined communication timings are unknown,
wherein a plurality of requests for timing information are transmitted, and
wherein the determination of the estimate of the time base for each at least one remote device comprises determining a timing relation between the timing of the transmission of each request and the communication timings based on the information in the respective obtained response.

7. The method according to claim 6, wherein the timing of the transmittal of a next request for timing information is selected based on the determined timing relation between the timing of the transmission of preceding request(s) and the communication timings so as to narrow a time window within which the communication event occurs.

8. The method according to claim 6, wherein the determining of the estimate of the time base comprises determining a time interval within which the time base lies based on a time window within which has been determined that the communication event occurs.

9. The method according to claim 8, wherein requests for timing information are repeatedly transmitted until the time interval within which the time base lies is within predetermined boundaries.

10. The method according to claim 6, wherein communication is performed according to a Bluetooth protocol.

11. The method according to claim 1, wherein the camera is the first device.

12. The method according to claim 1, wherein the at least one remote device comprises at least one remote flash device.

13. A control system for coordinating taking of a picture using a camera and initiation of a flash pulse of at least one flash device, said control system being arranged to control operation of a first device having a hardware processor operating in a first time base and at least one remote device having a hardware processor operating in a respective second time base, said control system comprising
a time base estimating element arranged to estimate a relation between the first and the respective second time bases,
a scheduler element arranged to schedule in the time base of the first device a timing for initiation of the flash pulse of the respective at least one flash device and/or a timing for initiation of taking a picture using the camera so that the coordination with the timing for taking the picture is obtained, and a communication interface arranged to transmit to the respective remote device the scheduled timing of that remote device, wherein the time base estimating element is arranged to
request transmission of at least one request over said communication interface time information relating to said at least one remote device, obtain a timing of the transmission of the request for time information based on the obtained first time base of the first device, obtain a response for each said at least one remote device comprising the requested time information in a second time base of that remote device, and determine the estimate of the second time base of the hardware processor of each at least one remote device in relation to the time base of the hardware processor of the first device based on the obtained timing of the transmission of the request for time information and the time information comprised in the response for the respective remote device.

14. The control system according to claim 13,
wherein the obtained response for each said remote device is transmitted to the first device over the communication interface and wherein the time base estimating element is designed so as to determine the estimate of the time base for each at least one remote device time base at the first device, and
wherein the scheduler element is arranged to feed to the communication interface the scheduled timing for the respective remote device in the second time base.

15. The control system according to claim 13,
wherein the at least one request comprises the obtained timing of the transmission of the request and wherein the time base estimating element is designed so as to determine the estimate of the second time base for each at least one remote device time base at the respective remote device and
wherein the scheduler element is arranged to feed to the communication interface the scheduled timing for the respective remote device in the first time base.

16. A camera device arranged to coordinate taking of a picture using said camera device and initiation of a flash pulse of at least one remote flash device, said camera device having a hardware processor operating in a first time base, wherein the at least one remote flash device has a hardware processor operating in a respective second time base, said camera device comprising
at least a part of a time base estimating element arranged to estimate a relation between the first and the respective second time bases,
a scheduler element arranged to schedule in the first time base a timing for initiation of the flash pulse of the respective at least one remote flash device so that coordination with the timing for taking the picture is obtained, and
a communication interface arranged to transmit to the respective remote flash device the scheduled timing of that remote flash device,
wherein the at least a part of the time base estimating element is arranged to
request transmission of at least one request over said communication interface time information relating to said at least one remote flash device, obtain a timing of the transmission of the request for time information based on the obtained first time base of the first device, obtain a response for each said at least one remote flash device comprising the requested time information in a second time base of that remote flash device, and determine the estimate of the second time base of the hardware processor of each at least one remote flash device in relation to the time base of the hardware processor of the first device based on the obtained timing of the transmission of the request for time information and the time information comprised in the response for the respective remote flash device.

17. The camera device according to claim 16, wherein the camera device is a camera phone or tablet arranged to communicate with the at least one remote flash device via a Bluetooth interface.

18. A flash device arranged to coordinate initiation of a flash pulse of the flash device with taking of a picture using a remote camera device, said flash device having a hardware processor operating in a first time base, wherein the remote camera device having a hardware processor operating in a second time base, said flash device comprising
at least a part of a time base estimating element arranged to estimate a relation between the first and the respective second time bases,
a scheduler element arranged to schedule in the time base of the flash device a timing for taking a picture using the camera device so that the coordination with the initiation of the flash pulse is obtained, and
a communication interface arranged to transmit to the camera device the scheduled timing of that remote camera device,
wherein the at least a part of the time base estimating element is arranged to
request transmission of at least one request over said communication interface time information relating to at least one remote camera device, obtain a timing of the transmission of the request for time information based on the obtained first time base of the first device, obtain a response for each said at least one remote camera device comprising the requested time information in a second time base of that remote camera device, and determine the estimate of the second time base of the hardware processor of each at least one remote camera device in relation to the time base of the hardware processor of the first device based on the obtained timing of the transmission of the request for time information and the time information comprised in the response for the respective remote camera device.

19. The method according to claim 1, wherein the communication between the first device and at least one remote device is performed over a wireless channel with predetermined communication timings, so called connect events, and wherein in the estimation of a time base for each at least one remote device is performed also based on the predetermined communication timings.

20. The method according to claim 19, wherein when the predetermined communication timings are unknown,
wherein a plurality of requests for timing information are transmitted, and
wherein the determination of the estimate of the time base for each at least one remote device comprises determining a timing relation between the timing of the transmission of each request and the communication timings based on the information in the respective obtained response.

21. The computer implemented method according to claim 6, wherein the estimating of a time base for a hardware processor of each at least one remote device in relation to the time base of the hardware processor of the first device comprises the steps of transmitting at least one request for time information relating to said at least one remote device, obtaining a timing of the transmission of the request for time information based on the obtained time reference of the first device, obtaining a response for each said at least one remote device comprising the requested time information in a time base of that remote device, and determining the estimate of the time base of the hardware processor of each at least one remote device in relation to the time base of the hardware processor of the first device based on the obtained timing of the transmission of the request for time information and the time information comprised in the response for the respective remote device.

22. The flash device according to claim 18, wherein the obtained response for each said remote camera device is transmitted to the first device over the communication interface and wherein the time base estimating element is designed so as to determine the estimate of the time base for each at least one remote camera device time base at the first device, and wherein the scheduler element is arranged to feed to the communication interface the scheduled timing for the respective remote camera device in the second time base.

* * * * *